United States Patent [19]
Liu

[11] Patent Number: 5,862,666
[45] Date of Patent: Jan. 26, 1999

[54] TURBINE ENGINE HAVING IMPROVED THRUST BEARING LOAD CONTROL

[75] Inventor: Xiaoliu Liu, Mississauga, Canada

[73] Assignee: Pratt & Whitney Canada Inc., Quebec, Canada

[21] Appl. No.: 771,906

[22] Filed: Dec. 23, 1996

[51] Int. Cl.⁶ ....................................................... F02C 3/08
[52] U.S. Cl. ............................................. 60/726; 415/106
[58] Field of Search .................................. 60/39.75, 726; 415/104, 105, 106, 107

[56] References Cited

U.S. PATENT DOCUMENTS

| | | |
|---|---|---|
| 3,826,084 | 7/1974 | Branstrom et al. . |
| 3,990,812 | 11/1976 | Radtke . |
| 4,236,869 | 12/1980 | Laurello . |
| 4,296,599 | 10/1981 | Adamson . |
| 4,348,157 | 9/1982 | Campbell et al. . |
| 4,425,079 | 1/1984 | Speak et al. . |
| 4,428,713 | 1/1984 | Coplin et al. . |
| 4,657,482 | 4/1987 | Neal . |
| 4,697,981 | 10/1987 | Brown et al. ............................ 415/104 |
| 4,701,105 | 10/1987 | Cantor et al. . |
| 4,761,947 | 8/1988 | Hennecke et al. . |
| 4,820,116 | 4/1989 | Hovan et al. . |
| 4,907,943 | 3/1990 | Kelch ...................................... 415/104 |
| 5,275,534 | 1/1994 | Cameron et al. . |
| 5,402,636 | 4/1995 | Mize et al. . |
| 5,440,874 | 8/1995 | Charier et al. . |

Primary Examiner—Louis J. Casaregola
Attorney, Agent, or Firm—Jeffrey W. Astle

[57] ABSTRACT

A modified turbine engine design in which control of the forward load on a thrust bearing is improved, while reducing or eliminating the need for the use of a balance piston is disclosed. The turbine engine has a longitudinal axis and comprises, a compressor for pressurizing gases in the engine. The impeller has an impeller rear face and a tip. The engine further comprises a shaft mounted to a thrust bearing for rotation about the axis. The impeller is fixed to the shaft for rotation therewith. A cavity fixed within the engine casing is defined at least by the impeller rear face and is in communication with the pressurized gases at the impeller tip. The engine further comprises a bleed in communication with both the cavity and the pressurized gases, so that the cavity is pressurized by the pressurized gases from the impeller tip and the bleed, thereby loading the impeller rear face to load the thrust bearing through the shaft. Preferably, the pressurized gases from the bleed reduce flow swirl in the cavity and thereby increase the pressure in the cavity.

12 Claims, 4 Drawing Sheets

TURBINE ENGINE HAVING IMPROVED THRUST BEARING LOAD CONTROL

FIELD OF THE INVENTION

The present invention relates to turbine engines, and more specifically to turbine engines having improved thrust bearing load control.

BACKGROUND OF THE INVENTION

Turbine engines, such as those used as aircraft turbojets or turbofans typically comprise from front to rear, in the direction of fluid flow in the engine, fan, compressor and turbine sections within a housing. These engine sections comprise a rotating fan, compressor and turbine that are axially mounted on one or more coaxial shafts for rotation about a central axis of the engine. The shafts are supported by at least two bearing assemblies. These bearing assemblies permit rotation of the shafts, and in turn the fan, compressor and turbine. The front-most bearing assembly in the direction of fluid flow in the engine, also prevents axial movement of the shaft within the case, and is referred to as a "thrust bearing assembly". While thrust bearing assemblies are typically machined to tight tolerances, small amounts of play between the bearing balls and the bearing races within the housings exist. This play is undesirable as it causes noise and vibration of the engine, when the engine is in operation.

Much of this play can be eliminated by exerting a forward load on the bearing. Such a forward load may be transferred to the bearing through the shafts. A forward load may, for example be exerted by pressurized gases from the compressor exerting a forward force on the rear portion of the compressor section, which in turn exerts a forward force on the shafts. However, due to size constraints on the engine and performance requirements of the compressor section, the amount of pressure exerted in conventional engine designs may not be enough to place sufficient forward load on the thrust bearing, in order to sufficiently reduce the play in the bearing assembly and accompanying noise and vibration.

Accordingly, one solution to address this problem has been include a rotating balance piston mounted on the shaft, aft the compressor section of the engine, as will be described in greater detail below. This balance piston is located between a high and low pressure region within the engine. The pressure differential on the piston exerts a forward force on the shaft, and in turn on the thrust bearing. This balance piston, however, is an expensive and critical rotating part of the engine. The smaller the piston, the better. Moreover, entire elimination of the piston is most desirable.

SUMMARY OF THE INVENTION

The present invention presents a modified turbine engine design in which control of the forward load on a thrust bearing is improved, while reducing or eliminating the need for the use of a balance piston.

In accordance with an aspect of the present invention, there is provided a turbine engine within an engine casing, said turbine engine having a longitudinal axis, said turbine engine comprising a compressor comprising an impeller, said impeller having and impeller rear face and an impeller tip, said compressor for pressurizing gases in said turbine engine; a shaft mounted to a thrust bearing for rotation about said axis, said impeller fixed to said shaft for rotation therewith; a cavity fixed within said engine casing and defined at least by said impeller rear face and in communication with said pressurized gases at said impeller tip; and a bleed in communication with both said cavity and said pressurized gases, said cavity pressurized by said pressurized gases from said impeller tip and said bleed, thereby loading said impeller rear face to load said thrust bearing through said shaft.

In accordance with another aspect of the present invention, there is provided a turbine engine comprising, within an engine casing a compressor section comprising an impeller; a combustion chamber; a turbine; a shaft mounted for rotation about a longitudinal axis connecting said impeller to said turbine; a thrust bearing about said shaft, mounted to said casing to limit movement of said shaft along and transversely of said axis; said compressor section defining a cavity between said impeller and said turbine opening toward said impeller; and a bleed from said combustion section to said cavity for bleeding pressurised gases to said cavity to pressurize said cavity to urge said impeller, and therefore said shaft toward a first position.

A turbine engine comprising, within an engine casing: a compressor section comprising an impeller; a combustion section, defined by a combustion section wall; a turbine; a shaft mounted for rotation about a central, longitudinal axis connecting said impeller to said turbine; a thrust bearing about said shaft, mounted to said casing to limit movement of said shaft along and away from said axis; said compressor section defining a cavity between said impeller and said combustion section; and said combustion section wall having an air bleed inlet to said impeller rear cavity for bleeding pressurized air from said combustion section into said impeller cavity, to pressurize said cavity to urge said impeller, and therefore said shaft toward a first position.

BRIEF DESCRIPTION OF THE DRAWINGS

In the figures which will illustrate embodiments of the invention.

DETAILED DESCRIPTION OF THE PREFERRED EMBODIMENTS

Figure 1:
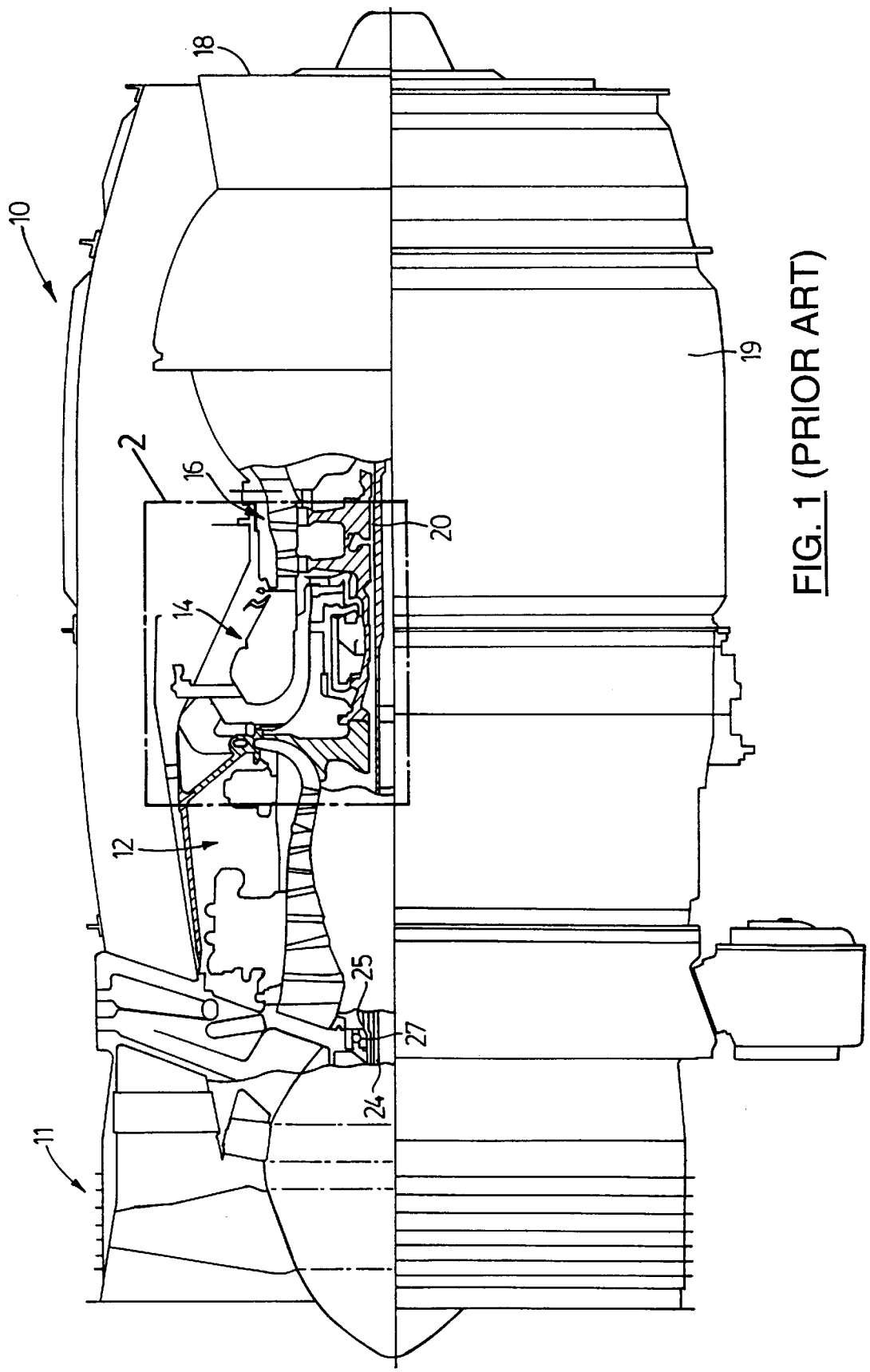
FIG. 1 is a side plan view of a representative turbine engine (known)

FIG. 1, illustrates a representative gas turbine engine 10. This engine 10 comprises a fan section 11, and a core engine which comprises in flow series a compressor section 12; a combustion section 14; and a turbine section 16; and an exhaust 18 all mounted within housing 19.

The turbine section 16 and compressor section 12 comprise multiple stages. At least one turbine within the turbine section 16 is rotationally connected to the final stage of compressor section 12 by shaft 20. Shaft 20 is supported near its rear by roller bearing assembly 52 and near its front by thrust bearing assembly 24. Thrust bearing assembly 24 comprises a housing 25 and thrust bearing 27.

Figure 2:
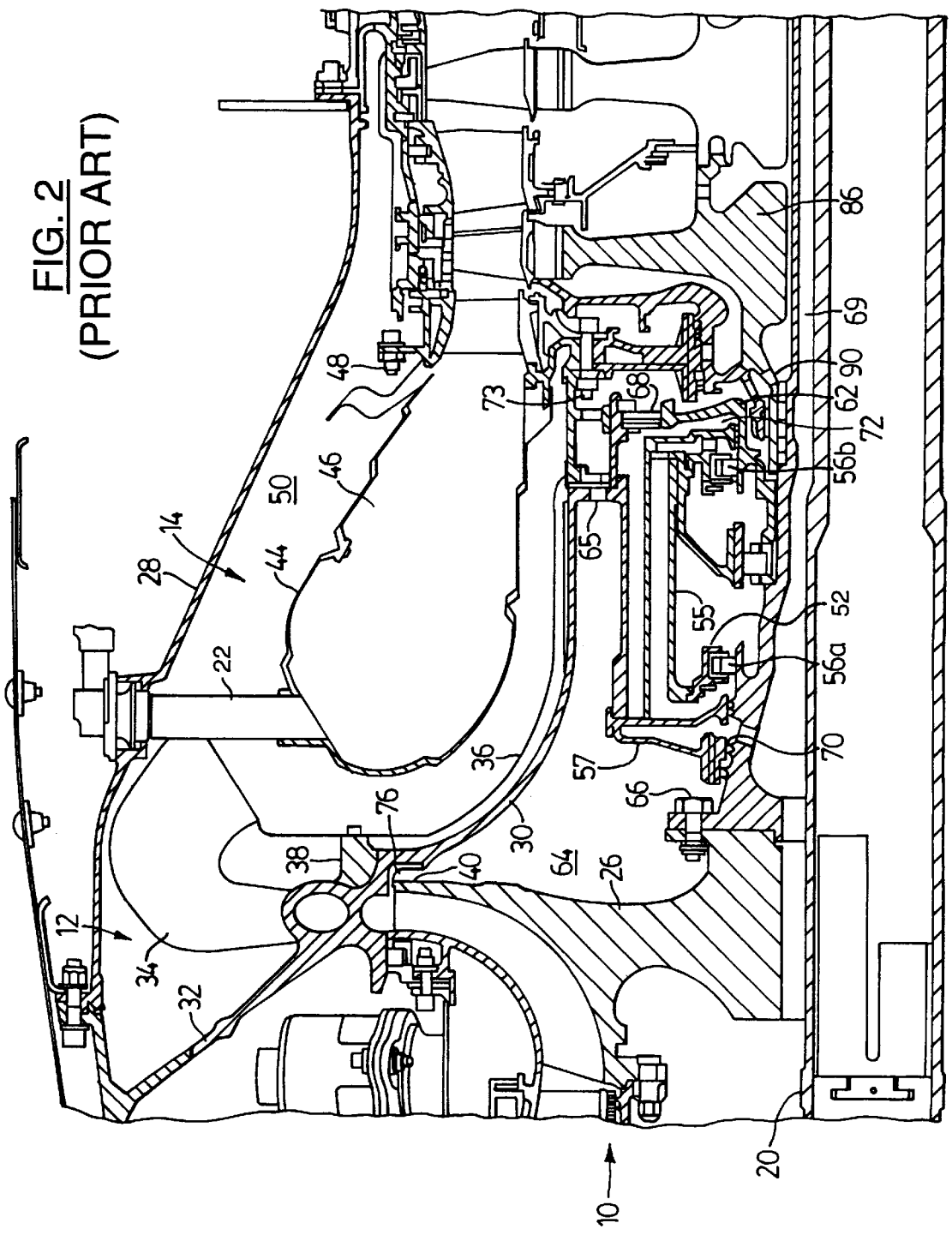
FIG. 2 is an enlarged cross-sectional view of a portion of FIG. 1.

FIG. 2 illustrates, in cross section, a portion of the a representative turbine engine, near the rear portion of the compressor section 12 and the front portion of combustion section 14. The final stage of the compressor section 12 is a rotating impeller 26 in flow communication with combustion section 14.

Combustion section 14 is formed on either side by combustor case 28 and diffuser case 30 forming part of diffuser assembly 32. Diffuser assembly 32 further comprises diffuser pipe 34 and heat shield 36 and heat shield support 38.

Diffuser pipe 34 is located within combustion section 14, and provides fluid communication between the tip 40 of impeller 26 and combustion section 14. Additionally, within combustion section 14 is combustor liner 44 defining combustion chamber 46 mounted to the engine housing 19 by case support 48. Combustion chamber 46 is in fluid communication with high pressure ("P3") region 50 of combustion section 14. Also in fluid communication with combustion chamber 46 is fuel nozzle 22.

Impeller 26 is mounted to outer most shaft 20 for rotation about a central axis of the engine. A stub shaft 66 rotates with impeller 26. Roller bearing assembly 52, comprising housing 55 and bearing 54 support the rear of shaft 20. Carbon, seals 56a and 56b seal bearing assembly 52. Also mounted to shaft 26 for rotating therewith is balance piston 62.

The bottom portion of diffuser case 30 and rear outer surface of impeller 26 and the front cover 57 of roller bearing housing 55 define an impeller rear cavity 64 ("IRC"). IRC 64 is sealed by labyrinth seals 70 and brush seal 68. Brush seal 68 extends from the rear portion 54 of bearing housing 55 and seals cavity 72 just ahead of balance piston 62. Cavity 72 is in flow communication with low pressure region 69, adjacent to shaft 20.

In operation, fan section 11 draws air into engine 10, the air passes from fan section 11 to compressor section 12, where it is compressed by multiple compressor stages. The final stage of compression is impeller 26. High pressure air leaves the tip of impeller 26. The majority of this high pressure air is directed to combustion section 14 by diffuser pipe 34. There, much of the, P3 air enters chamber 46 and is mixed with fuel from nozzle 22 and combusted. A small portion of the compressed P3 air, however is bled into IRC 64 through an unsealed gap 76 between the tip 40 of impeller 26 and diffuser case 30.

This air bleed through gap 76 pressurizes IRC 64. Pressurizing IRC 64, exerts a force on the rear of impeller 26 and diffuser case 30. The force on the rear of impeller 26, in turn exerts a forward force on shaft 20, and hence thrust bearing 27. In theory, the engine could be designed so as to provide sufficient surface area on the rear of impeller 26, so that the pressure in IRC 64 exerts sufficient forward pressure on the rear of impeller 26 and thus thrust bearing 27, in order to reduce the play and thus noise and vibration in bearing assembly 24. However, in practice, size and weight of impeller 26 and engine 10 and the pressure of output air of compressor section 12 are of primary concern. Accordingly, the relative pressure within IRC 64 and rear surface area of impeller 26 are often insufficient to apply sufficient forward load on thrust bearing 27. Accordingly, additional forward load on shaft 20 and thrust bearing 25 are provided by balance piston 62, as follows.

High pressure air is allowed to exit IRC 64, at its rear 65. This pressurizes cavity 73 aft balance piston 62. Cavity 72, on the opposite side of balance piston 62 is in flow communication with a low pressure region 69 proximate shaft 20. As such, cavity 72 is at a lower pressure than cavity 73, thereby creating a pressure differential across balance piston 62. This pressure differential, will in turn, create a forward force on piston 62, shaft 20, and thrust bearing 27. The size of balance piston 62 and pressure differential across it may be chosen to compensate for inadequate forward force on the rear surface of impeller 26, thereby providing the requisite forward load on thrust bearing 27.

Under normal "take-off" condition, the thrust bearing is under a forward load of approximately 2800 lbs., of which approximately 2000 lbs. are provided by balance piston 62. As noted this balance piston rotates, and is therefore a critical part of the engine.

Figure 4:
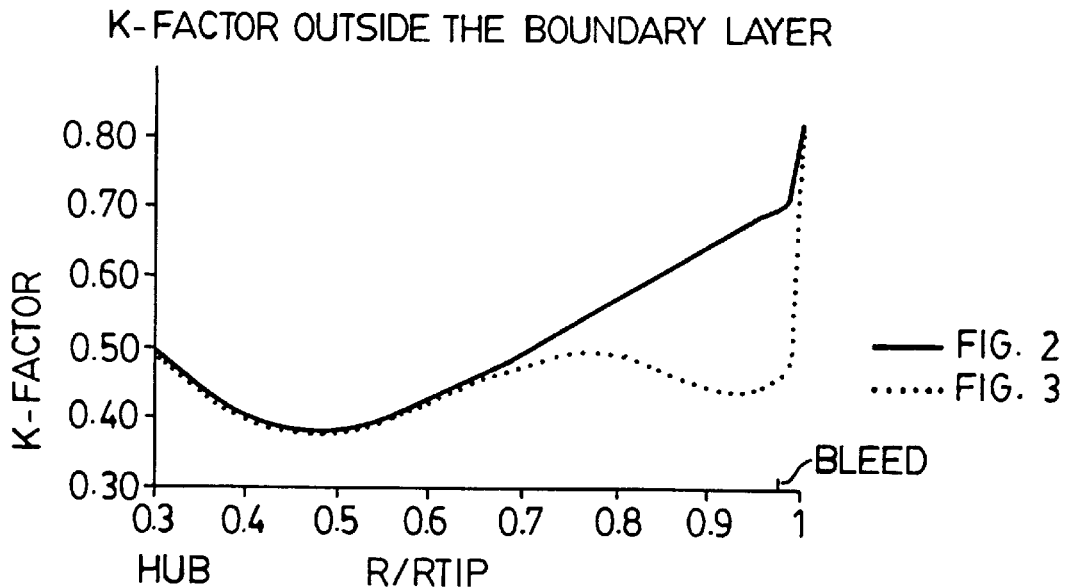
FIG. 4 is a graph of tangential air velocity characteristics of a portion of a turbine engine.

As the pressurizing air bled into IRC 64 emanates from the tip of impeller 26, it will have considerable tangential velocity or "swirl" in the direction of rotation of impeller 26, as the compressed air enters IRC 64. This tangential velocity varies as the air travels radially inward in IRC 64. The solid line of FIG. 4 illustrates a simulation of the ratio of the tangential velocity of the air to the local tangential velocity of the impeller (also known as the "K-factor") for various radial distances within IRC 64 for the engine of FIGS. 2.

Figure 5:
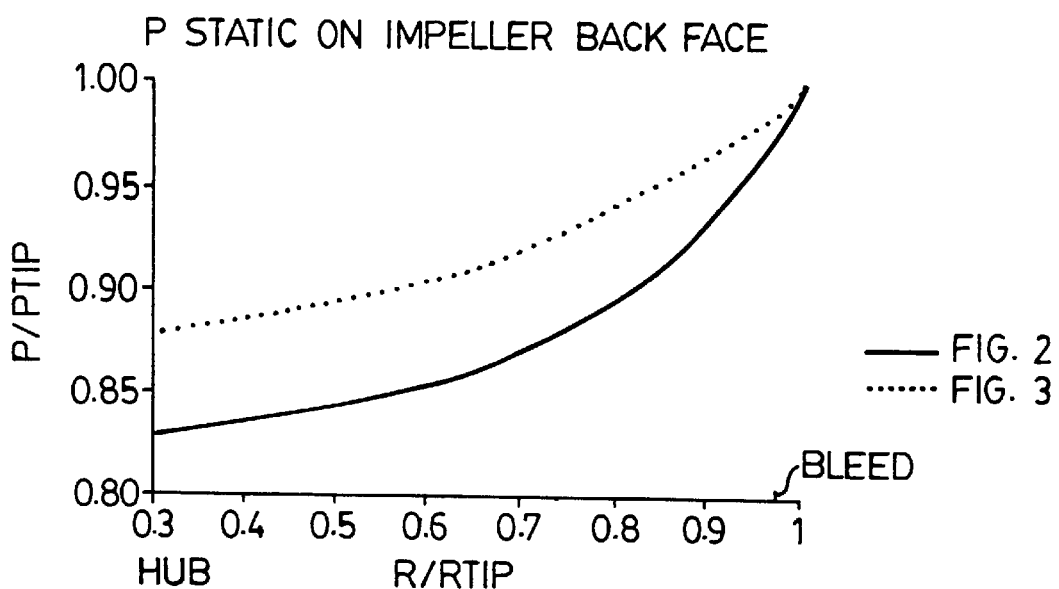
FIG. 5 is a graph of pressure characteristics of a portion of a turbine engine.

As a result of the "swirl" the air's static pressure decreases radially inward. This, in turn creates a radial pressure gradient within IRC 64. This pressure gradient significantly reduces average pressure within IRC 64 and hence the forward force on impeller 26. The solid line of the graph of FIG. 5 illustrates this decrease in static pressure on impeller 26, at varying radial distances from impeller tip 40 for the engine of FIGS. 1 and 2.

The present invention recognizes, that reducing the "swirl" of air in IRC 64 may significantly increase the average static pressure within IRC 64, and accordingly provide sufficient forward load on thrust bearing 27 in order to reduce the size requirement for balance piston 62, or eliminate it entirely.

Figure 3:
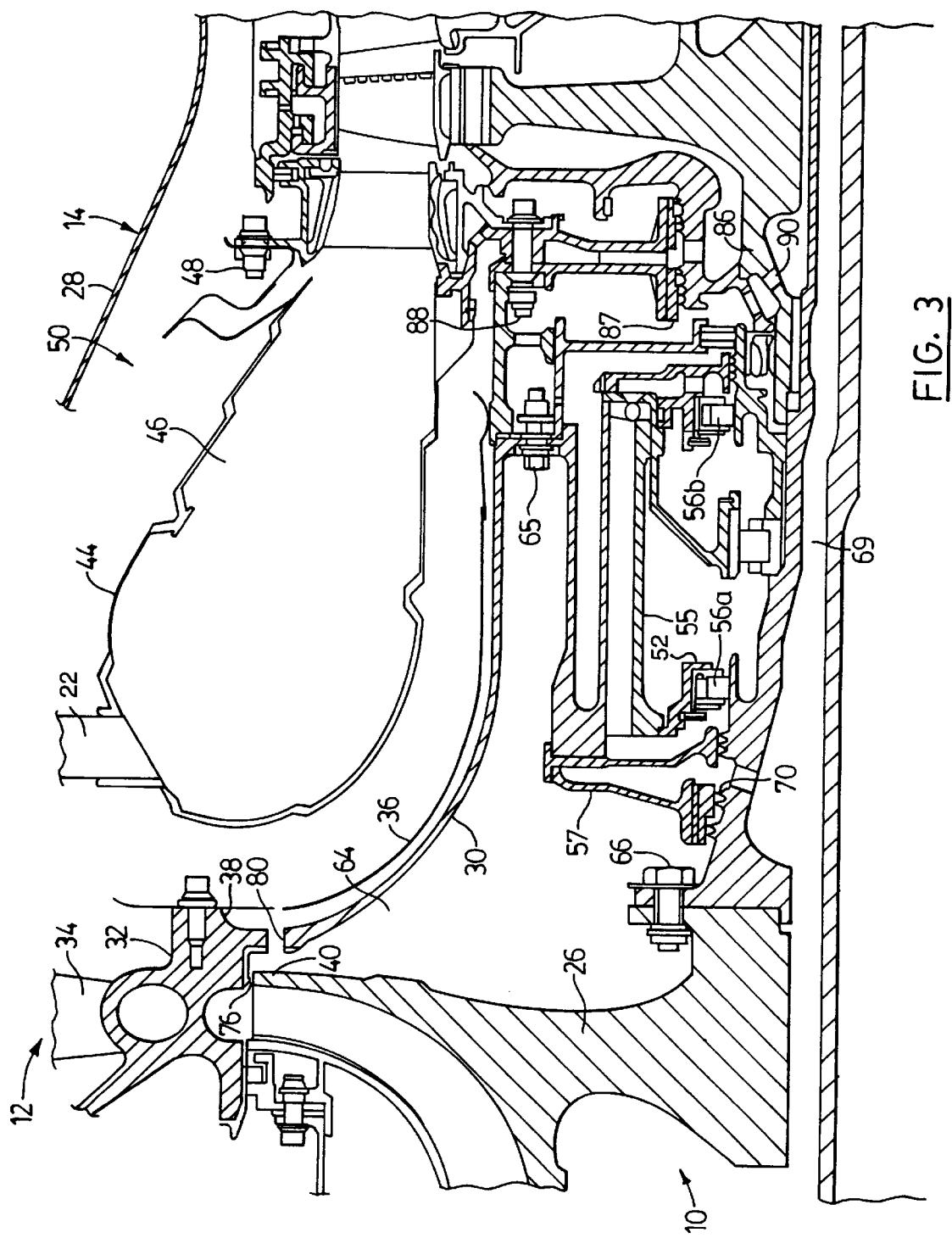
FIG. 3 is a cross section of a portion of a representative turbine engine in accordance with an aspect of the present invention.

FIG. 3, illustrates in cross-section, a portion of a jet engine modified in order to bleed high pressure air from combustion section 14 of engine 10 into IRC 64, near the tip of impeller 26.

As noted above, the majority of air leaving impeller 26 is directed to combustion section 14 by diffuser pipe 34. Diffuser pipe 34 reduces the tangential velocity and therefore "swirl" of air entering combustion section 14 from impeller 26 significantly. P3 air in high pressure air region 50 of combustion section 14 is thus almost "swirl free". Bleeding high pressure air from combustion section 14 into IRC 64 near the tip of impeller 26 significantly reduces the swirl of the air within IRC 64 and thus the pressure gradient created by this swirl.

In order to maintain the same amount of flow through IRC 64 as in the embodiment of FIG. 2, the size of holes 90 is adjusted. As the total air flow through IRC 64 is the same as in the embodiment of FIG. 2, the impeller tip bleed flow into IRC 64 will be reduced by the amount of high pressure air bled into IRC 64.

The bleed of air from combustion section 14 into IRC 64 may be achieved by small bleed passageways or holes 80 through diffuser case 30 in front of heat shield 36. The size, location and number of holes will determine the amount of bleed of P3 air from combustion section 14 into IRC 64, thereby allowing for the adjustment of the effect of the bled air on the load of thrust bearing 27. An optimal location for the bleed holes 80 is near the impeller tip 40, as illustrated.

The broken line of the graph of FIG. 4 illustrates a simulation of the effect a bleed hole 80 at a distance 2% from the tip of impeller 26 on the K-factor (detailed above) at various radial distances within IRC 64, of the embodiment of FIG. 3. This reduction of tangential velocity near tip 40 of IRC 64 reduces the pressure gradient in IRC 64 and results in an overall increase of pressure within IRC 64 at various radial distances. The broken line of the graph of FIG. 5, further illustrates a simulation of the resulting increased static pressure on the rear surface of impeller 26 of the embodiment of FIG. 3, at various radial distances within IRC 64.

The overall increased pressure within IRC 64, in turn, increases the forward force on the rear of impeller 26, shaft 20 and thrust bearing 27. Simulations indicate that the total forward load on the rear surface of impeller 26 in a representative engine modified as in FIG. 3, is increased by approximately 1300 lbs (over the engine of FIG. 2). This allows for the elimination of balance piston 62 (FIG. 2) as shown in FIG. 3, and results in approximately 2100 lbs forward load on thrust bearing 27, which is sufficient.

Additionally, as the entire IRC 64 is now at a higher pressure, the air pressure in region 88 (FIG. 3) (equivalent to cavity 73 in FIG. 2) is now higher than without bleed 80, thereby allowing for a reduction in size of holes 90 on high pressure turbine disc 86, while permitting an air flow rate through holes 90 equivalent to the unmodified engine of FIG. 2. This increases the life of turbine disc 86. The increased pressure in cavity 88 allows for an increase in clearance of labyrinth seal 87, reducing the sensitivity of this seal to wear. It further provides a convenient method of regulating thrust load by adjusting the size of bleed holes 80.

Eliminating this balance piston removes a critical rotating component of engine 10.

It will be further understood that the invention is not limited to the illustrations described herein which are merely illustrative of a preferred embodiment of carrying out the invention, and which are susceptible to modification of form, size, arrangement of parts and details of operation. The invention may easily implemented to modify existing engine designs other than the representative engine, described above. The invention, rather, is intended to encompass all such modification within its spirit and scope, as defined by the claims.

I claim:

1. A turbine engine within an engine casing, said turbine engine hating a longitudinal axis, said turbine engine comprising:
   a compressor comprising an impeller, said impeller having an impeller rear face and an impeller tip, said compressor for pressurizing gases in said turbine engine;
   a shaft mounted to a thrust bearing for rotation about said axis, said impeller fixed to said shaft for rotation therewith;
   a combustion section in flow communication with pressurized gases from said compressor;
   a cavity fixed within said engine casing and defined at least by said impeller rear face and in flow communication at said impeller tip with pressurized gases from said impeller tip, said impeller tip gases having a tangential velocity about said axis within said cavity; and
   a bleed in flow communication between said cavity and said combustion section with pressurized gases from said combustion section, said bleed adapted to guide the flow of said combustion section gases to reduce said tangential velocity of said impeller tip gases in said cavity, said cavity pressurized by pressurized gases from said impeller tip and from said bleed, thereby loading said impeller rear face to load said thrust bearing through said shaft.

2. The turbine engine of claim 1 wherein said cavity extends to said impeller tip and wherein said bleed opens proximate said impeller tip.

3. The turbine engine of claim 2 further comprising:
   an air diffuser pipe extending from said impeller tip to said combustion section, said air diffuser pipe providing said flow communication between said compressor and said combustion section, said air diffuser pipe adapted to reduce said tangential velocity of said gases from said impeller tip to said combustion section.
   wherein said bleed is in communication with gases from said diffuser pipe.

4. The turbine engine of claim 2 wherein said bleed comprises a plurality of passageways from said combustion section to said cavity.

5. The turbine engine of claim 4 wherein said passageways extend generally perpendicular to said impeller rear face.

6. The turbine engine of claim 1 wherein said bleed extends from a high pressure region of said combustion section.

7. A turbine engine comprising, within an engine casing:
   a compressor section comprising an impeller, said impeller having a tip;
   a combustion section in flow communication with pressurized gases from said compressor section;
   a turbine;
   a shaft mounted for rotation about a longitudinal axis connecting said impeller to said turbine;
   a thrust bearing about said shaft, mounted to said casing to limit movement of said shaft along and transversely of said axis;
   said compressor section defining a cavity between said impeller and said turbine, said cavity in flow communication at said impeller tip with pressurized gases from said impeller tip; and
   a bleed in flow communication between said cavity and said combustion section, said bleed proximate said impeller tip for bleeding pressurized gases from said combustion section to said cavity to pressurize said cavity to urge said impeller, and therefore said shaft toward a first position.

8. The turbine engine of claim 7 further comprising an air diffuser pipe extending from said impeller tip and in fluid communication with said combustion section for guiding air from said impeller into said combustion section and for reducing tangential velocity of said impeller air.

9. The turbine engine of claim 8 wherein said bleed comprises a plurality of passageways from said combustion section to said cavity.

10. The turbine engine of claim 7 wherein said bleed extends from a high pressure region of said combustion section.

11. A turbine engine comprising, within an engine casing:
    a compressor section comprising an impeller having an impeller tip;
    a combustion section, defined by a combustion section wall;
    a turbine;
    a shaft mounted for rotation about a central, longitudinal axis connecting said impeller to said turbine;
    a thrust bearing about said shaft, mounted to said casing to limit movement of said shaft along and away from said axis;
    said compressor section defining a cavity between said impeller and said combustion section; and said combustion section wall having a bleed inlet to said cavity, proximate said impeller tip for bleeding pressurized air from said combustion section into said cavity, to pressurize said cavity to urge said impeller, and therefore said shaft toward a first position.

12. The turbine engine of claim 11 further comprising an air diffuser pipe extending from said impeller tip, having an outlet in fluid communication with said combustion section for guiding air from said impeller into said combustion section and for reducing tangential velocity of said air from said impeller, and wherein said bleed inlet extends through said combustion section wall proximate said outlet.

* * * * *

UNITED STATES PATENT AND TRADEMARK OFFICE
CERTIFICATE OF CORRECTION

PATENT NO. : 5,862,666
DATED : Jan. 26, 1999
INVENTOR(S) : Xiaoliu Liu

It is certified that error appears in the above-identified patent and that said Letters Patent is hereby corrected as shown below:

In the claims:

claim 1, column 5, line 42, delete "hating" and insert --having--

Signed and Sealed this

Sixth Day of July, 1999

Attest:

Q. TODD DICKINSON

*Attesting Officer*      *Acting Commissioner of Patents and Trademarks*